United States Patent [19]

Kuhfus

[11] 4,349,705
[45] Sep. 14, 1982

[54] LIGHTED TELEPHONE DIAL

[75] Inventor: Gerd Kuhfus, London, Canada

[73] Assignee: Northern Telecom Limited, Montreal, Canada

[21] Appl. No.: 260,889

[22] Filed: May 6, 1981

[51] Int. Cl.³ .......................................... H04M 1/22
[52] U.S. Cl. ............................. 179/90 L; 179/81 C;
                                  362/24; 340/365 R; 200/314
[58] Field of Search ................. 179/90 L, 81 C, 84 L,
           179/178; 340/365 R; 200/310, 313, 314, 317;
                                          362/24, 30, 84

[56] References Cited

U.S. PATENT DOCUMENTS

| | | | |
|---|---|---|---|
| 3,069,509 | 12/1962 | Sherron | 362/24 |
| 3,305,677 | 2/1967 | Bov | 362/84 |
| 3,489,860 | 1/1970 | Greenman et al. | 179/81 C |
| 4,056,701 | 11/1977 | Weber | 340/365 R |
| 4,124,879 | 11/1978 | Schoemer | 362/24 |
| 4,163,883 | 8/1979 | Boulanger | 200/314 |
| 4,177,501 | 12/1979 | Karlin | 362/26 |

Primary Examiner—Gerald L. Brigance
Attorney, Agent, or Firm—Sidney T. Jelly

[57] ABSTRACT

A pushbutton dial having pushbuttons arranged in three columns and four rows has the buttons illuminated by four LED's positioned in a light-guide plate having apertures which surround the pushbuttons. The LED's are in recesses at intersections of the outer columns and top and bottom rows, each recess between four adjacent apertures. Guide grooves at the edges of the plate redirect light issuing from the LED's and passing between apertures. The plate is transparent and the buttons translucent, the buttons being illuminated from all round their peripheries.

6 Claims, 9 Drawing Figures

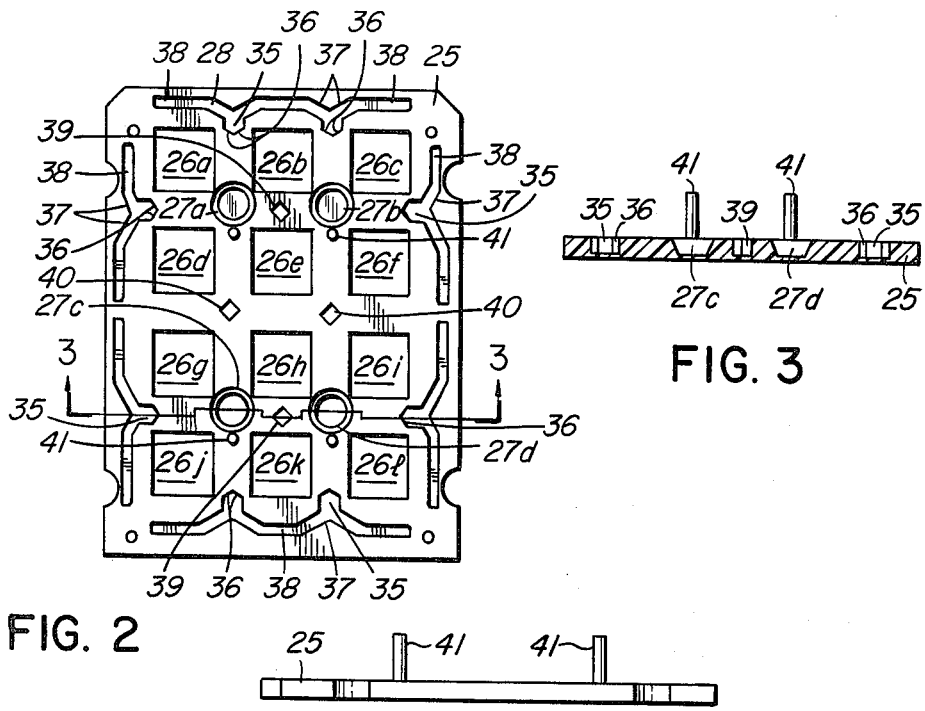
FIG. 2
FIG. 3
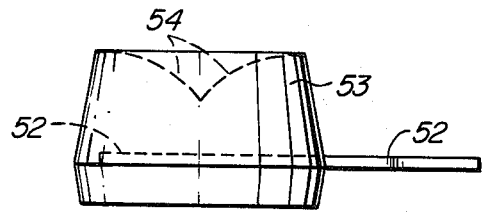
FIG. 4
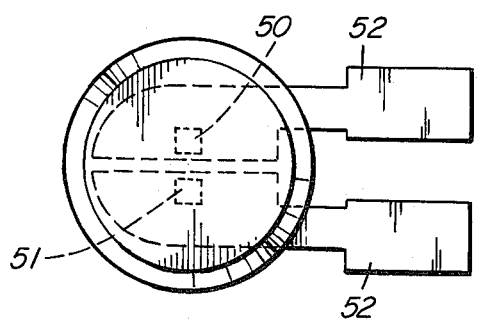
FIG. 5
FIG. 6
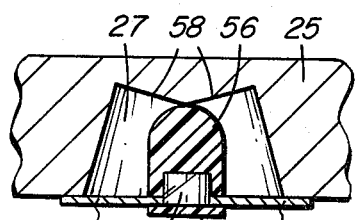
FIG. 7

LIGHTED TELEPHONE DIAL

This invention relates to a lighted telephone dial of the pushbutton type, with illumination by means of a plurality of light emitting diodes (LEDs) with a flat light-guide plate, the buttons being illuminated or glowing.

Various arrangements exist for illuminating dials, generally including incandescent lamps mounted below the dial, or lamps of LEDs mounted in the pushbuttons. Two main disadvantages of such systems are the power requirements, and, in the case of incandescent lamps, space, particularly when mounted below the dial. With the present development to thinner dial assemblies, use of incandescent lamps is no longer possible.

The present invention provides a pushbutton dial assembly in which the buttons are illuminated by light transmitted laterally via a light-guide plate from a small number of LEDs, less than the number of buttons, the guide-plate having apertures through which the buttons pass, light being transmitted across from the plate to each button. Each button is translucent and glows, being readily visible in the dark.

This invention will be readily understood by the following description of certain embodiments, by way of example, in conjunction with the accompanying drawings in which:

FIG. 2 is a bottom plan view of one form of light-guide plate;

FIG. 3 is a cross-section on the line 3—3 of FIG. 2;

FIG. 4 is a side view in the direction of arrow A in FIG. 2;

FIG. 5 is a side view of one form of an encapsulated LED for use in the light-guide plate;

FIG. 6 is a top plan view of the encapsulated LED of FIG. 5;

FIG. 7 is a side view of another form of an LED positioned in a recess in a light-guide plate;

Figure 1:
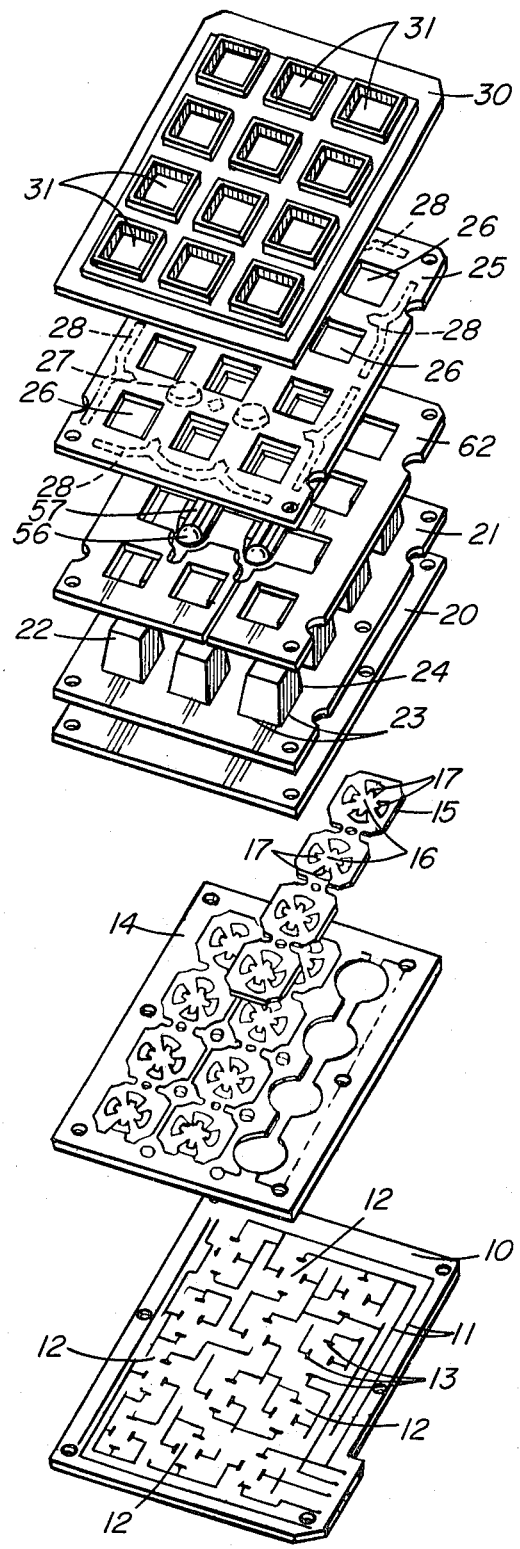
FIG. 1 is an exploded perspective view of a form of pushbutton assembly incorporating the invention.

As illustrated in FIG. 1, a pushbutton dial assembly comprises, in a sandwich form, a printed circuit board (PCB) 10 having thereon a conductor pattern 11 defining a plurality of switch positions 12, each position comprising a plurality of contact areas 13. On the PCB 10 is positioned a switch member 14 holding a plurality of spring contact switches 15. In the example the switches are in strips of four and each switch has a domed portion 16 and cantilevered contact members 17. The switches are as described in U.S. Pat. No. 4,029,916 issued June 14, 1977, the disclosure of which is included herein by reference.

Over the switch member 14 and switches 15 is positioned a thin flexible membrane 20. On the membrane rests a pushbutton member 21 which has a plurality of cantilevered pushbuttons 22. The pushbuttons have a narrow clearance on three sides 23 and connected to the main member by a hinge portion on the fourth side. This arrangement is also described in the above-mentioned U.S. Pat. No. 4,029,916.

Resting on the pushbutton member 21 is a light-guide plate 25. Plate 25 has a plurality of apertures 26, one for each pushbutton 22 and the pushbuttons extend up through the apertures. The form of light-guide plate 25 will be described in more detail in conjunction with FIGS. 2, 3 and 4, but as seen in FIG. 1 the plate 25 has recesses 27 for reception of LEDs and shaped grooves 28 which act as reflectors. Over the light-guide plate 25 fits a bezel 30 having a plurality of apertures 31, an aperture for each pushbutton.

Various ways of holding the assembly together can be used. As an example, protrusions molded on the back or under surface of the bezel 30 can be passed through holes in the other members and the protrusions molded over on the back or undersurface of the PCB 10. Some means must be provided for supplying an electric power to the LEDs in the recesses 27. Leads can be brought out to one or more edges and connected to the PCB or a lead frame can be positioned between the pushbutton member 21 and the light-guide plate 25, the LEDs mounted on the lead frames.

FIGS. 2, 3 and 4 illustrate in more detail the light-guide plate 25. The plate is of transparent plastic material, for example an acetyle copolymer, two examples of which are "Celion" acetyle copolymer by Celanese Co. Ltd., and V52 by Rhome & Hass. The particular material chosen in addition to being readily molded, is selected to have as high a transmission value as possible for the emission wavelength of the LEDs.

Basically the light-guide plate 25 is a flat plate with the plurality of apertures 26. The example of FIGS. 2, 3 and 4 is for what can be termed a normal or conventional sized pushbutton dial. The apertures 26 are arranged in four rows and three columns being individually identified as 26a to 26l. Four recesses 27a to 27h are provided. The recesses 27 are positioned at intersections to rows and columns. Thus, in the top two rows, in FIG. 2, a recess 27a is formed at the intersection between apertures 26a, 26b, 26d and 26e, and a further recess 27b at the intersection between apertures 26b, 26c, 26e and 26f. Two further recesses 27c and 27d are positioned at similar intersections between apertures 26g, 26h, 26; 26k, and 26n 26i, 26k and 26l respectively. Thus, with four rows, each adjacent four apertures in the top two rows are positioned around a recess 27 and each adjacent four apertures in the bottom two rows are positioned around a recess 27. Thus light emitted from the LEDs can travel inbetween the rows and between the columns.

Grooves 28 are formed near the edges of the plate and act to reflect light from the LEDs around the apertures 26. Thus, as seen in FIG. 2, each groove has one or more inward projections 35 having rearwardly inclined inner surfaces 36. Behind the projections 35 are inclined surfaces 37 which reflect light sideways along groove portions 38. The projections 35 are aligned with the recesses 27 and thus also the LED's. While two grooves 28 are shown at each edge, these can be extended to form a single groove at each edge.

Between each adjacent pair of recesses 27, at the top and bottom of the plates, is a recess 39 and also further recesses 40 midway between each central pair of recesses 27. These recesses 39 and 40 are of a somewhat rectangular or diamond plan form and act to reflect light sideways, the recess 39 reflecting light towards the apertures 26 of the central column and the recesses 40 reflecting light sideways between rows. Light is transmitted through all of plastic material, directly from the LEDs and via reflection by grooves 28 and recesses 39 and 40, and thus light is transmitted to all round the periphery of each aperture 26. At the peripheries of each of the apertures 26, light is emitted across the small gap between aperture periphery and the pushbuttons 22.

The pushbuttons 22 are of translucent or "milky" material which "glows" as a result of the light being transmitted to it. The material of the pushbutton member 21 is selected to be this translucent form but also be easily moldable and have flexibility for the hinged portions hingedly connecting the pushbuttons to the member. One such material is a polycarbonate having a "milky" translucent colour. Identifying numbers or emblems are formed on the top surface of each pushbutton by a suitable process, as by printing filling shaped recesses with coloured ink or plastic.

When the bezel 30, which is opaque, is in position the light-guide plate cannot be seen. In the dark, or in a dim light, the pushbuttons appear to glow, appearing separate and individual and readily identifiable.

In FIGS. 2, 3 and 4 are shown spigots or projections 41 projecting from the rear face of the plate 25. These can pass through holes in the pushbutton member 21, diaphragm 20, switch member 14 and PCB 10, being rivetted or molded over to form an assembly to which the bezel 30 can be attached. This is an alternative arrangement to that described above and illustrated in FIG. 1.

FIGS. 5 and 6 illustrate one form of encapsulated LED for positioning in the recesses 27. An LED is shown at 50, with a power limiting resistor at 51. Only the LED may be provided in the encapsulation, the resistor being provided elsewhere, for example on the PCB 10. Leads 52 provide for connection of electric power. The shape of the encapsulation 53, is such as to fit closely in the recesses 27. A reflecting top surface 54 is provided, the surface defined by a rotation of an arcuate surface about the central axis. The arcuate surface may be a true arc, or have a parabolic curve, or some other form. By this means, light emitted from the top surface of the LED is reflected sideways into the light-guide plate.

FIG. 7 illustrates an alternative form of encapsulated LED. The LED 55, is encapsulated in an epoxy resin 56, and has two contacts or leads 57. The encapsulated LED is positioned in a recess 27 and in this example, the recess has a conical top surface 58. This surface 58 reflects the light from the LED, which is surface emitting, laterally into the light oxide plate 25. Instead of being conical, the surface 58 can be made arcuate, or approximating thereto.

Figures 8, 9:
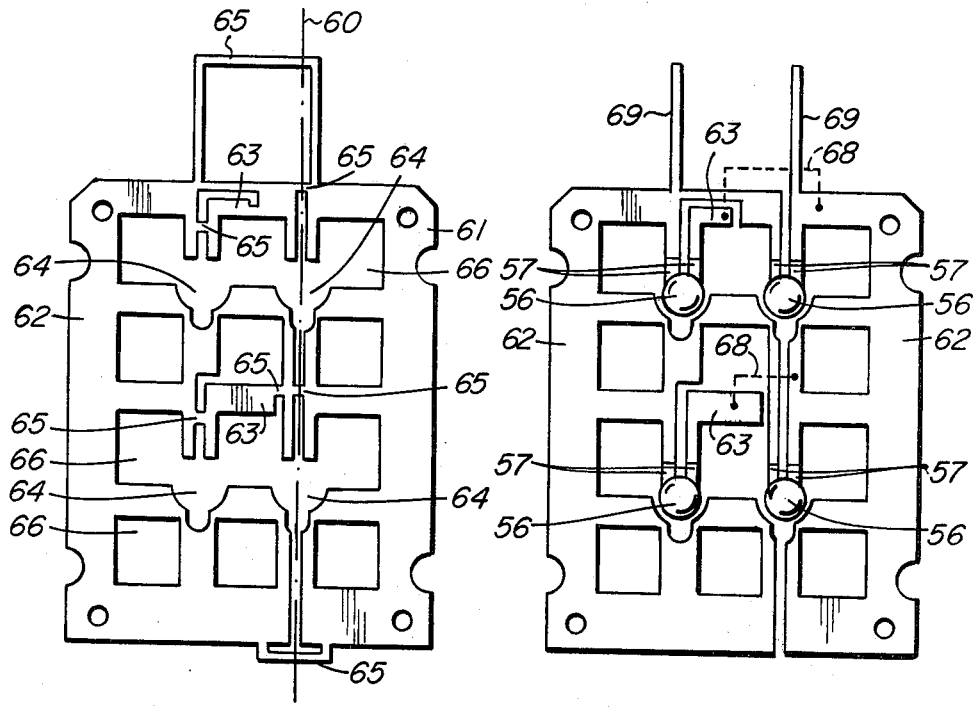
FIGS. 8 and 9 are plan views of one form of lead frame for use in supplying electric power to the LEDs, in the manufactured form and final form respectively.

FIG. 8 illustrates a lead frame, conveniently of sheet aluminum, stamped or etched from sheet or ribbon. Initially, to hold the individual sections together for handling and storage case, bridge members are provided. Thus, in FIG. 8, one section of the frame extends to the right of the chain dotted line 60, and indicated generally at 61, while the other section, 62, extends to the left of the dotted line 60. However two small sections 63 also form part of section 61. The LED positions are indicated at 64. The bridge members are indicated at 65. Apertures for the pushbuttons are indicated at 65.

The encapsulated LED's are attached to the lead frame by spot welding the leads of the LED's to the lead frames. This is seen in FIG. 9, the LED's for example as in FIG. 7, indicated at 56, the leads 57 welded to the lead frame. Once the LED's have been attached the bridge members 65 are removed, also as seen in FIG. 9. Finally, two electrically conducting bridges or connections are made to electrically connect sections 63 to section 61, these connections being indicated by dotted lines 68. One way of making such connections is by first positioning short lengths of adhesive tape over the intervening parts of section 62 and then soldering leads over the tape from sections 63 to section 61. Connection is made to the lead frame by leads 69. The lead frame is shown in its position in FIG. 1, although other ways of providing a power supply can be used, for example a conductive pattern on the rear surface of the light guide-plate.

What is claimed is:

1. A light telephone dial of the pushbutton type, comprising;
    a printed circuit board having a conductor pattern on a top surface of the board, the conductor pattern defining a plurality of switch positions, each position having a plurality of contact areas;
    a switch member on said printed circuit board and having a plurality of switches, a switch aligned with each of said switch positions, each switch having a plurality of cantilever contacts members, a member aligned with each contact area;
    a pushbutton member on said switch member and having a plurality of translucent cantilevered pushbuttons, a button aligned with each switch, the switch positions, switches and buttons arranged in four rows and three columns;
    a translucent light guide plate positioned over said pushbutton member and having a plurality of apertures, an aperture for each pushbutton, the pushbuttons extending up through the apertures;
    four recesses in a lower surface of the light guide plate, a recess at each intersection between a top row and the columns and between a bottom row and the columns, each recess positioned between four adjacent apertures;
    grooves in the lower surface of the light guide plate, one along each of the top and bottom edges and at least one along each of the side edges, projections in the grooves extending in towards the spaces between rows and columns and having rearwardly inclined inner surfaces to present pointed ends towards said recesses, outwardly and rearwardly inclined surfaces behind said projections, an inclined surface on each side of a center line through a said pointed end, and further portions extending from said inclined surfaces parallel to said edges;
    a light emitting diode positioned in each of said recesses, and means for supplying electrical power to the diodes;
    the arrangement such that light from the diodes travels through the light-guide plate, part of the light transferred directly from the plate to the pushbuttons, that part of the light passing between apertures entering said grooves in said light-guide plate and being deflected sideways along the grooves and re-entering the light-guide plate to transfer to the pushbuttons, the pushbuttons illuminated on all sides.

2. A dial as claimed in claim 1, including further recesses in the lower surface of the light-guide plate, a recess between each pair of recesses and of approximately square plan form.

3. A dial as claimed in claim 1, including two grooves at each side edge, each groove having a projection extending towards a recess.

4. A dial as claimed in claim 3, including a single groove at top and bottom edges, each groove having two spaced apart projections, each projection extending towards a recess.

5. A dial as claimed in claim 1, including an opaque bezel positioned over said light-guide plate, said bezel including a plurality of apertures, an aperture for each pushbutton.

6. A dial as claimed in claim 1, said means for supplying electrical power to the diodes comprising a lead frame positioned between said light-guide plate and said pushbutton member.

* * * * *